Sept. 16, 1930.  E. I. SPONABLE  1,776,049
SOUND RECORD
Filed March 26, 1928
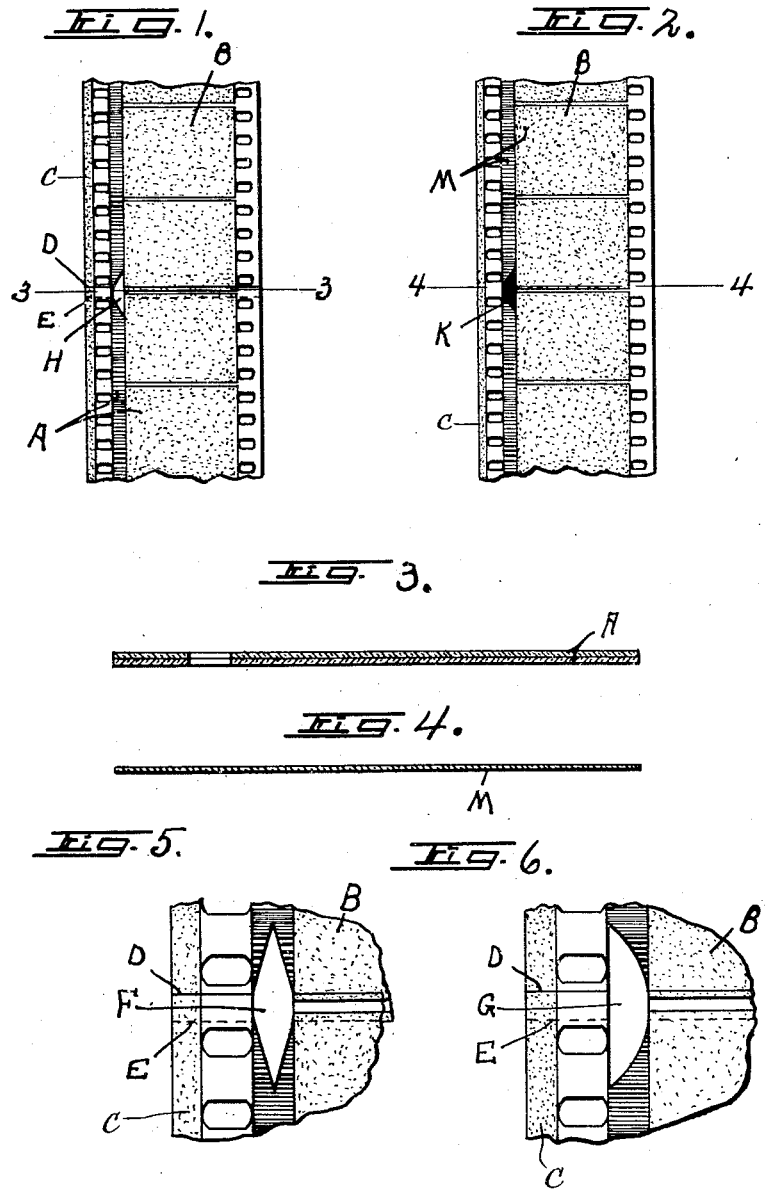

Patented Sept. 16, 1930

1,776,049

UNITED STATES PATENT OFFICE

EARL I. SPONABLE, OF NEW YORK, N. Y., ASSIGNOR TO FOX CASE CORPORATION, OF NEW YORK, N. Y., A CORPORATION OF NEW YORK

SOUND RECORD

Application filed March 26, 1928. Serial No. 264,704.

This invention relates to certain new and useful improvements in sound records, and more specifically to film records of light wave variations corresponding to sound wave variations.

In the production of moving picture films it is customary to splice the film together at various points throughout its length to obtain the desired sequence of pictures, or for other reasons, and when the sound record is produced on a section of the film at one edge of the pictures, the splice which is not detrimental to the moving picture, results in a disagreeable click in the sound picture, and the same conditions prevail when the negative is used to print a positive for the reason that the positive, altho not spliced, bears the image of the negative splice, and the same disagreeable click results in reproduction from the positive.

Further, this same click results if the sound record is produced independently of moving pictures and the sound record be spliced for any purpose, and the main object of this invention is to eliminate the click or undesirable noise in the reproduction of sound from a sound picture, and more particularly to effect this result in the use of a positive sound record printed from a spliced negative sound record.

Other objects and advantages relate to the details of the structure and the parts thereof, and to the methods used to effect the advantageous results, all as will more fully appear from the following description taken in connection with the accompanying drawings, in which:—

Figure 1 is a plan view of a section of a spliced negative film embodying the feature of this invention.

Figure 2 is a plan view of a positive as printed from the negative of Figure 1.

Figure 3 is a section on line 3—3, Figure 1.

Figure 4 is a section on line 4—4, Figure 2.

Figures 5 and 6 are views similar to Figure 1 illustrating modified forms of the invention.

In Figures 1 and 2 the squares B in the center of the film A represent the moving picture portions of the film and the narrow strip C at the left of the pictures B constitutes the sound record portion of the film which has been spliced by overlapping the adjacent ends of two sections of film between the full line D and the dotted line E.

It has heretofore been proposed to eliminate the undesirable click resultant in sound records at a spliced portion of the record by in some manner gradually decreasing the light rays passing through the film from a point a short distance forward of the splice up to the splice, and then gradually increasing the light rays passing through the film from the splice rearwardly of the film, i. e. gradually decreasing the light rays passing through the film from a normal condition of the sound record to a condition where no rays pass through the film at the spliced portion between the lines D and E, and then gradually increasing the rays passing through the film from the line D rearwardly of the film to a point where the film again assumes its normal sound record condition.

This invention provides a new and novel structure and method for effecting this result in a simple and effective manner. In general, the negative as produced, is thereafter used for the production of any desired number of positives and the positives are then used for effecting reproduction of the original sounds from the record, and in order to eliminate in reproduction of a positive sound record the click which results from the fact that the positive of necessity bears an image of the negative splice, I have found that it is only necessary to cut out a portion of the film bearing the negative sound record so that when printing of the positive is effected in the usual manner, there will result on the positive sound record an opaque space of the same form as the cut-out portion of the negative sound record. And in order to effect the desired results, the cut-out portion of the negative should be of a form including the spliced portion of the negative record throughout substantially the entire width of the sound record, or at least that portion of the sound record used for reproduction, and should also include portions extending rearwardly and forwardly from the splice which are of gradually decreasing width, and terminate a short distance upon opposite sides of the splice.

As shown in Figure 1, the sound record has a portion or section cut out, as indicated at H and the opening produced at H is generally of triangular form with a flat portion at its apex, which flat portion is of substantially the same width as the width of the splice so that all of the spliced portion of the film bearing the sound record is removed and substantially triangular, forwardly and rearwardly tapering portions are also removed upon opposite sides of the splice.

When a positive sound record M is printed from a negative provided with such a cut-out portion, there will result upon the positive an opaque space K which will eliminate the production upon the positive of an image of the splice, and will also provide substantially triangular tapered opaque portions extending rearwardly and forwardly therefrom so that the passage of light rays through the positive sound record will gradually be decreased from a point slightly forward of the splice until at the splice substantially no rays will pass through the record and rearwardly of the splice the rays passing through the film will gradually increase to a normal condition of the sound record. The cut-out portion of the negative sound record may take various forms while accomplishing the objects of this invention, and in Figure 5 the negative sound record is shown as provided with a substantially diamond shape cut-out portion F with flat portions at opposite apices, such flat portions being of a length equal to the width of the splice.

A further modified form is shown in Figure 6 in which the cut-out portion G is in substantially the form of a segment of a circle, but under any of these conditions, and perhaps various other forms, the rays of light passing through the sound record are gradually decreased up to the splice and gradually increased rearwardly from the splice, thereby eliminating the objectionable click resultant from either reproducing a negative sound record having a splice, or a positive sound record bearing the image of a splice, and altho I have shown and described specific forms of the invention as illustrative of perhaps preferred embodiments, I do not desire to restrict myself to the details of form, shape or arrangement as various changes and modifications may be made within the scope of the appended claims.

I claim:

1. A spliced film having a sound record thereon, and said film having an opening through the sound record portion thereof which gradually decreases in width in both directions from the splice.

2. A spliced film having a sound record thereon, and said film having an opening through the sound record portion thereof which eliminates the spliced portion throughout substantially the width of the sound record and gradually decreases in width as it extends from opposite sides of the splice.

In witness whereof I have hereunto set my hand this 19th day of March 1928.

EARL I. SPONABLE.